(12) United States Patent
Hwang et al.

(10) Patent No.: US 8,159,626 B2
(45) Date of Patent: Apr. 17, 2012

(54) LIQUID CRYSTAL DISPLAY DEVICE

(75) Inventors: Seongsoo Hwang, Gumi-si (KR); Sangmoo Song, Gumi-si (KR); Inho Hwang, Seoul (KR); Daehyun Kim, Seoul (KR); Junyeob Lee, Daegu (KR)

(73) Assignee: LG Display Co., Ltd., Seoul (KR)

( * ) Notice: Subject to any disclaimer, the term of this patent is extended or adjusted under 35 U.S.C. 154(b) by 463 days.

(21) Appl. No.: 12/318,436

(22) Filed: Dec. 29, 2008

(65) Prior Publication Data

US 2010/0079692 A1    Apr. 1, 2010

(30) Foreign Application Priority Data

Sep. 26, 2008  (KR) .................. 10-2008-0094797

(51) Int. Cl.
*G02F 1/1333* (2006.01)
*G02F 1/1343* (2006.01)
*G02F 1/13* (2006.01)
*H01J 9/26* (2006.01)

(52) U.S. Cl. ............. 349/40; 349/139; 349/187; 445/25

(58) Field of Classification Search .............. 349/40
See application file for complete search history.

(56) References Cited

U.S. PATENT DOCUMENTS

| 6,567,148 | B1 * | 5/2003 | Akiyama et al. | 349/158 |
| 2007/0002268 | A1 * | 1/2007 | Park et al. | 349/187 |
| 2008/0303964 | A1 * | 12/2008 | Lee et al. | 349/33 |
| 2009/0086114 | A1 * | 4/2009 | Higuchi et al. | 349/12 |

FOREIGN PATENT DOCUMENTS

| JP | 04-051220 | | 2/1992 |
| JP | 04051220 | A * | 2/1992 |
| JP | 09-329795 | | 12/1997 |
| JP | 09329795 | A * | 12/1997 |
| JP | 2007140353 | A * | 6/2007 |
| JP | 2008-185934 | | 8/2008 |
| JP | 2008185934 | A * | 8/2008 |

* cited by examiner

*Primary Examiner* — Michelle R Connelly Cushwa
(74) *Attorney, Agent, or Firm* — McKenna Long & Aldridge LLP

(57) ABSTRACT

The present disclosure relates to the liquid crystal display device and the fabricating method thereof. The liquid crystal display device comprises: a first substrate including a ground line supplied with a ground voltage, and an extended ground line extending from the ground line, and attaching a first polarization plate; a second substrate joining to the first substrate with a sealant and attaching a second polarization plate; and a conductive upper-lower substrate connecting static electricity discharging path connecting to the extended ground line by forming at edges of the first polarization plate and the second polarization plate, and by intruding between the first and the second substrates.

6 Claims, 7 Drawing Sheets

LIQUID CRYSTAL DISPLAY DEVICE

This application claims the benefit of Korea Patent Application No. 10-2008-0094797 filed on Sep. 26, 2008, which is incorporated herein by reference for all purposes as if fully set forth herein.

BACKGROUND OF THE INVENTION

1. Field of the Invention

The present disclosure relates to the liquid crystal display device and the fabricating method thereof.

2. Discussion of the Related Art

The active matrix type liquid crystal display (or "AMLCD") device represents the video images using the thin film transistor (or "TFT") as the switching element. The liquid crystal display device is smaller than the cathode ray tube (or "CRT") so that is easily applied to the display device for portable information device, office automation device, computer and so on. Furthermore, it is rapidly applied to the television display with replacing the CRT.

As shown in the FIG. 1, on the lower glass substrate of the liquid crystal display device (GLSL), the data lines (DL) and the gate lines (GL) crosswisely disposed each other. The TFTs are formed at each crossed portions of the data lines and gate lines, and the pixel electrodes connected to each TFTs so that the pixel electrodes and TFTs are arrayed in matrix type. On the upper glass substrate (GLSU), a black matrix (BM), a color filter (CF) and a common electrode (COM) are formed. Furthermore, on the light incident surface of the lower glass substrate (GLSL), a lower polarization plate is attached, and on the light outgoing surface of the upper glass substrate (GLSU) a upper polarization plate is attached. The light absorbing axis of the lower polarization plate and the upper polarization plate are perpendicularly crossed. In addition, alignment films are formed on the inner surfaces of the lower glass substrate (GLSL) and the upper glass substrate (GLSU) with which the liquid crystal layer (LC) is contacted.

The manufacturing method for the active matrix type liquid crystal display device comprises steps of cleaning the substrates, patterning the substrates, printing and rubbing the alignment film, joining the substrates, dropping liquid crystal material, mounting panel, inspecting panel, repairing panel and so on.

When a static electricity is applied to the liquid crystal display device, the thin film elements in the LCD device may be damaged. To prevent the damages due to the static electricity, there is a method in which the glass substrate of the LCD device is connected to the ground line using a conductive tape. However, it is hard to attach the conductive tape at a plurality of glass substrate at the same time, so that the conductive tape should be attached to only one glass substrate at a time. Therefore, attaching the conductive tape to the glass substrates make the fabricating lap time to be long. In the interim, the static electricity may be applied to the LCD device through the polarization plate so that the conductive tape attached to the glass substrate may not prevent the static electrode properly.

SUMMARY OF THE INVENTION

Accordingly, the present invention is directed to a liquid crystal display and fabricating method thereof that substantially obviates one or more of the problems due to limitations and disadvantages of the related art.

An advantage of the present invention is to provide a liquid crystal display device for enhancing the static-electricity-protection effect and the fabricating method of the LCD device in which the forming the static electricity discharging path is performed in short lap processing time.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display device includes: a first substrate including a ground line supplied with a ground voltage, and an extended ground line extending from the ground line, and attaching a first polarization plate; a second substrate joining to the first substrate with a sealant and attaching a second polarization plate; and a conductive upper-lower substrate connecting static electricity discharging path connecting to the extended ground line by forming at edges of the first polarization plate and the second polarization plate, and by intruding between the first and the second substrates.

The extended ground line extends to one end of the first substrate so that an end of the extended ground line connects to the conductive upper-lower substrate connecting static electricity discharging path.

The conductive upper-lower substrate connecting static electricity discharging path includes any one of a conductive polymer and a metal.

The conductive upper-lower substrate connecting static electricity discharging path is formed at one edge of the first and the second substrates.

The conductive upper-lower substrate connecting static electricity discharging path is formed at both edges of the first and the second substrates.

The conductive upper-lower substrate connecting static electricity discharging path is formed at three edges of the first and the second substrates.

The fabricating method according to the embodiments of the present disclosure comprises processes of: forming a ground line supplied with a ground voltage and an extended ground line extended from the ground line on a first substrate, and attaching a first polarization plate at the first substrate; attaching a second polarization plate at a second substrate; joining the first and the second substrates with a sealant; and forming a conductive upper-lower substrate connecting static electricity which is discharging path at edge of the first polarization and second polarization plates and which is connecting to the extended ground line by intruding between the first and the second substrates, by dipping edges of the first and the second substrates into a material any one of conductive liquid and metal paste.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Referring to FIGS. 2 to 10, the preferred embodiments of the present disclosure will be explained.

Figure 1:
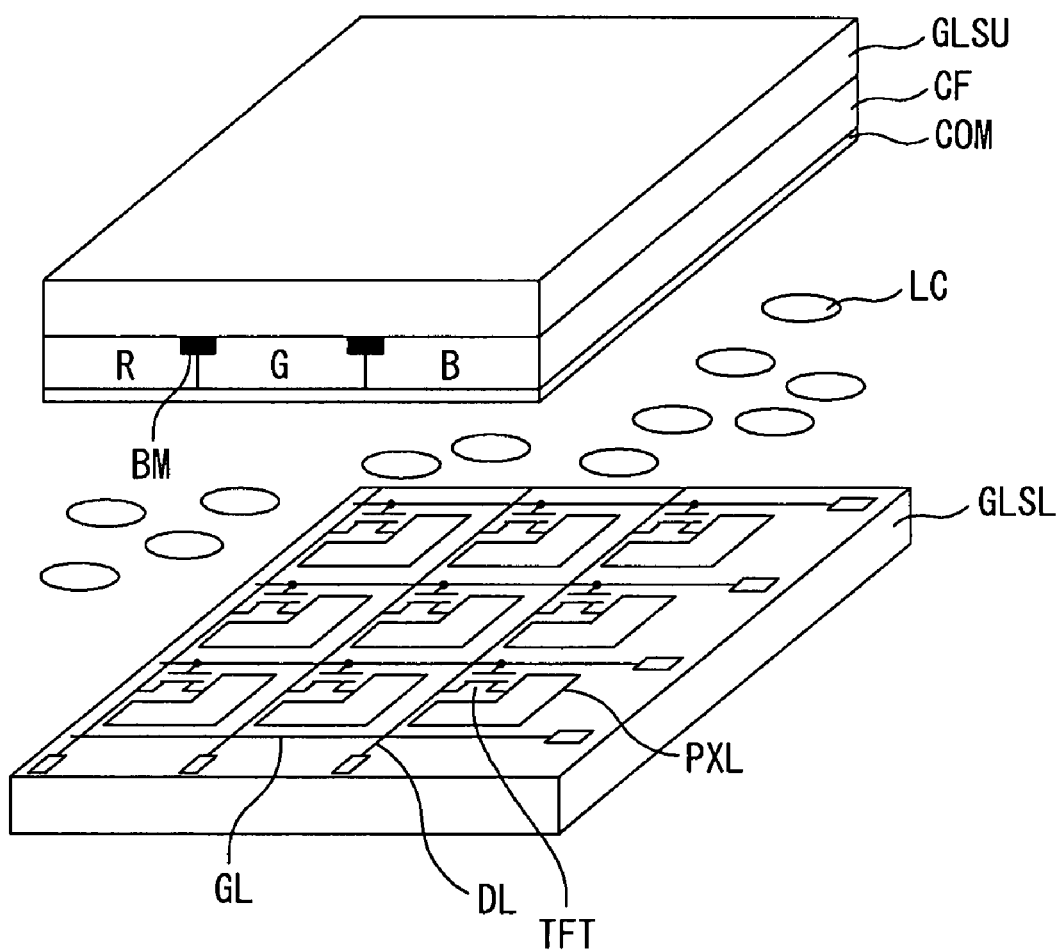
FIG. 1 is the diagram illustrating the structure of the active matrix type liquid crystal display device.
Figure 2:
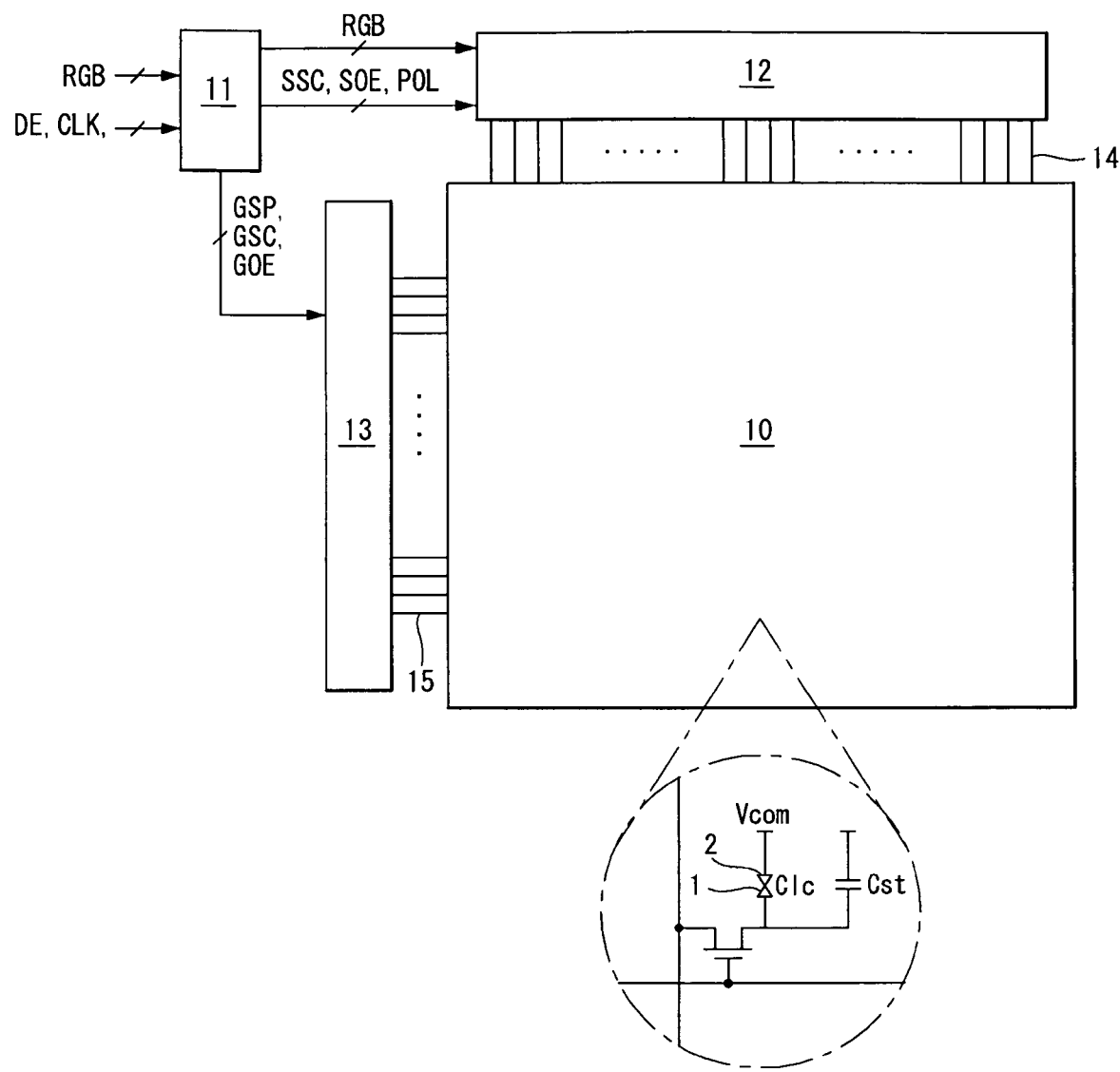
FIG. 2 is a block diagram illustrating the liquid crystal display device according to the embodiment of the present disclosure.

Referring to FIG. 2, the liquid crystal display device according to the embodiment of the present disclosure includes a liquid crystal display panel 10, a timing controller 11, a data drive circuit 12 and a gate drive circuit 13. The data drive circuit 12 includes a plurality of the source drive IC. The gate drive circuit 13 includes a plurality of the gate drive IC.

The liquid crystal display panel 10 includes two glass substrates and a liquid crystal layer therebetween. The active array (AA) showing the video image in the liquid crystal display panel 10 includes the liquid crystal cells (Clc) disposed in matrix pattern by the crossing structure of the data lines 14 and the gate lines 15.

On the lower glass substrate of the LCD panel 10, data lines 14, gate lines 15 TFTs and storage capacitor (Cst) are formed. In addition, on the inactive area outside of the active array area, that is the edge portions of the lower glass substrate, the ground line connecting to the static electricity discharging path, and the common voltage supplying line supplie with the common voltage are formed. The liquid crystal cells (Clc) connecting to the TFT is driven by the electric field formed between the pixel electrode 1 and the common electrode 2.

On the upper glass substrate of the LCD panel 10, a black matrix, a color filter and a common electrode 2 are formed. The common electrode 2 is formed on the upper glass substrate for the vertical electric field driving type such as TN mode (Twisted Nematic mode) and VA mode (Vertical Alignment mode). On the contrary, for the horizontal electric field driving type such as IPS mode (In-Plane Switching mode) and FFS mode (Fringe Field Switching mode), the common electrode 2 is formed on the lower glass substrate with the pixel electrode 1. The LCD panel 10 is not restricted to the TN (or "Twisted Nematic") mode, the VA (or "Vertical Alignment"), the IPS (or "In Plane Switching") mode, or the FFS (or "Fringe Field Switching"), but is applied to any other liquid crystal driving mode.

On the outer surfaces of the upper and lower glass substrates of the liquid crystal display panel 10, polarization plates are attached. On the inner surface of the upper and lower glass substrate of the liquid crystal display panel 10, alignment layers for pre-tilt angle of the liquid crystal material are formed.

At the edge of the upper polarization plate attached on the upper glass substrate and at the edge of the lower polarization plate attached on the lower glass substrate, conductive polymer or metal such as silver (Ag) is formed. Furthermore, conductive polymer or metal such as silver (Ag) is formed between the upper glass substrate and the lower glass substrate. The conductive polymer or metal forms a static electricity discharging path is formed for inducing the static electricity from the upper or lower polarization plate to the ground line. The static electricity discharging path will be explained with the FIGS. 3 to 7.

The timing controller 11 supplies the digital video data (RGB) to the data drive circuit 12. Furthermore, the timing controller 11 receives the timing signal such as the data enable (DE) signal and the dot clock (CLK), and generates the control signal for controlling the operating timing of the data drive circuit 12 and the gate drive circuit 13. The timing controller 11 counts the data enable signal (DE) to distinguish 1 frame period and 1 horizontal period. The timing signal of the timing controller 11 includes the vertical synchronizing signal (Vsync) and the horizontal synchronizing signal (Hsync). The control signal for controlling the operating timing of the drive circuits 12 and 13 include the gate timing controlling signal for controlling the operating timing of the gate drive circuit 13 and the data timing control signal for controlling the operating timing of the data drive circuit 12 and the polarity of data voltage.

Each of data drive ICs of the data drive circuit 12 includes the shift register, the latch, the digital-analog converter, the output buffer and so on. The data drive circuit 12 latches the digital video data (RGB) under the control of the timing controller 11. In addition, the data drive circuit 12 converts the digital video data (RGB) into the analog positive/negative gamma compensation voltage according to the polarity control signal (POL), and generates the positive/negative analog data voltages, and supplies these data voltages to the data lines 14.

The gate drive circuit 13 includes the shift register, the AND gate, the level shifter, the output buffer, and so on. The gate drive circuit 13 sequentially supplies the gate pulse to the gate lines 15 in response to the gate timing control signal.

Under the LCD panel 10, a backlight unit is disposed for irradiating light to the LCD panel 10. Further, an inverter circuit may be included for turning on/off the backlight unit.

The data drive circuit 12, the gate drive circuit 13 and the timing controller 11 can be integrated into an one chip as shown on FIGS. 3 to 7.

The fabricating method of the liquid crystal display device above mentioned will be explained step by step, as follows.

The fabricating method of the LCD device includes processes of cleaning the substrates, patterning the substrates, printing and rubbing the alignment film, joining the substrates and dropping liquid crystal material, mounting panel, inspecting panel, repairing panel, assembling module and so on. The process of cleaning the substrate is to remove the foreign materials contaminating the surface of the substrate with cleaning agent. After any one process of joining the substrates and dropping liquid crystal material, mounting panel, inspecting panel, and repairing panel, the process of forming a static electricity discharging path is performed.

Figure 3:
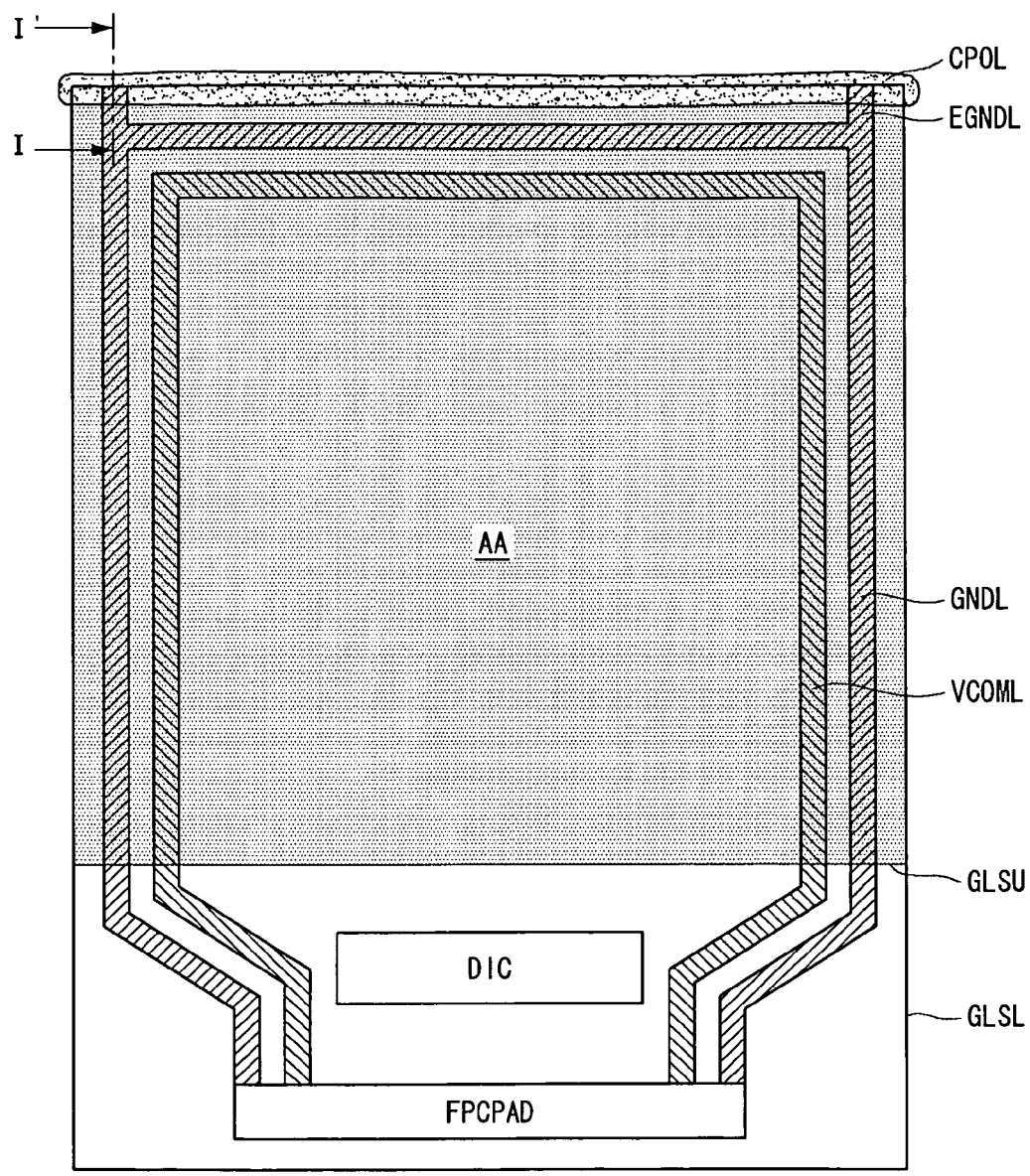
FIG. 3 is a plane view illustrating the static electricity discharging path according to the first embodiment of the present disclosure.

The process of patterning substrate includes the process of patterning the layers formed on the upper glass substrate (GLSU) and the process of patterning the layers formed on the lower substrate (GLSL). In the process of patterning substrate, the ground line (GNDL), the extended ground line (EGNDL) and the common voltage supplying line (VCOML) as shown in FIG. 3 are formed at the edge of the lower glass substrate (GLSL), with the thin film elements of the active array area.

The process of printing and rubbing the alignment film is to coat the alignment film on the glass substrates and to rub the alignment film with rubbing clothe.

In the process of joining the substrates and dropping liquid crystal material, the sealant (SL) is drawn on any one of upper and lower glass substrates (GLSU and GLSL) and the liquid crystal material is dropped on the other glass substrate. For example, after that the sealant (SL) is formed on the upper glass substrate (GLSU) and the liquid crystal (LC) material is dropped on the lower glass substrate (GLSL), the upper glass substrate (GLSU) having the sealant is turn over and fixed by the upper stage, and then the lower glass substrate (GLSL) having liquid crystal (LC) material is fixed by the lower stage. The sealant may be selected one of thermosetting sealant and UV (or "ultraviolet") light setting sealant. The process of joining the substrates and dropping liquid crystal material explained in Korean patent application KR 10-2007-0111040 filed by the applicant of this disclosure can be used. After aligning the upper glass substrate (GLSU) with the lower glass substrate (GLSL), the vacuum force is applied to one of the stages by operating the vacuum pump so as to join the upper and lower glass substrates (GLSU and GLSL). At this time, the cell gap of the liquid crystal (LC) layer is larger than the designed cell gap. By injecting nitrogen gas (N2) to adjust to the atmospheric pressure, the cell gap will be satisfied with the designed cell gap by the pressure difference between the inner side and outer side of the joined glass substrates (GLSU and GLSL). After that, for example, in the case that the light setting sealant is selected, a UV light is irradiated to the sealant through the upper stage (STGU) and the upper glass substrate (GLSU) to harden the sealant SL. The process of dripping liquid crystal may be replacing with the process of injecting the liquid crystal in which the liquid crystal material is injected through the injection port after joining the upper and lower glass substrate with the sealant.

The process of mounting panel is to mount the drive IC (DIC) on the lower glass substrate (GLSL) with the COG (or "Chip On Glass") process. After that, using the anisotropic conductive film (or "ACF"), a flexible printed circuit (or "FPC") board is attached to the lower glass substrate (GLSL). The FPC electrically connects the drive IC, the ground line and the common voltage supplying line to the external system board.

The process of inspecting includes the inspecting the integrated circuit (or "IC"), inspecting the signal wirings such as the data line and gate line formed on the lower glass substrate (GLSL), inspecting panel after forming pixel electrodes, and inspecting panel after joining substrates and dropping liquid crystal material.

The process of repairing is to recover the signal lines or TFT which are decided as to be possible to repair.

The process of assembling module is for aligning the liquid crystal display panel and the backlight unit each other and for assembling them into one module with various casing materials.

The process of forming a static electricity discharging path is performed after any one process of the joining the substrates and dropping liquid crystal material, mounting panel, inspecting panel, and repairing panel to form the static electricity discharging path on the liquid crystal display panel 10, as shown in FIG. 3.

FIG. 3 illustrates the static electricity discharging path according to the first embodiment of the present disclosure.

Referring to FIG. 3, the static electricity discharging path includes a ground line (GNDL) formed at the edge of the lower glass substrate (GLSL), an extended ground line (EGNDL) expanding to the end of the lower glass substrate (GLSL) from the ground line (GNDL), and a upper-lower substrate connection static electricity discharging path (CPOL) formed at the edges of the upper polarization plate and the lower polarization plate and therebetween. To the common voltage supplying line (VCOML), the common voltage is supplied for supplying the common voltage to the common electrode 2 of the liquid crystal cell. The upper polarization plate is attached to the upper glass substrate (GLSU) and the lower polarization plate is attached to the lower glass substrate (GLSL). The drawing reference 'DIC' is an one-chip drive IC integrating the data drive circuit 12, the gate drive circuit 13 and the timing controller 11.

The ground line (GNDL), the extended ground line (EGNDL) and the common voltage supplying line (VCOML) formed at the outside of the active area, that is edge of the lower glass substrate (GLSL), are made of the same material including a transparent material such as indium tin oxide (or "ITO"), tin oxide (or "TO"), indium tin zinc oxide (or "ITZO"), and indium zinc oxide (or "IZO"), and a metal material such as copper (Cu), aluminum (Al), molybdenum (Mo) and chromium (Cr). The ground line (GNDL) is connected to the ground power source through the FPC pad (FPCPAD) at which the FPC is attached. The common voltage supplying line (VCOML) is connected to the common voltage source through the FPC pad (FPCPAD).

The upper-lower substrate connecting static electricity discharging path (CPOL) including the conductive polymer and metal such as silver (Ag) electrically connects the upper polarization plate and the lower polarization plate to the extended ground line (EGNDL) formed on the lower glass substrate (GLSL) to discharge the static electricity applied from the upper and lower polarization plates to the ground line (GNDL). As the static electricity intruded into the polarization plate is discharged via the static electricity discharging path, the thin film elements in the active area and the drive IC are protected from the static electricity.

Figure 4:
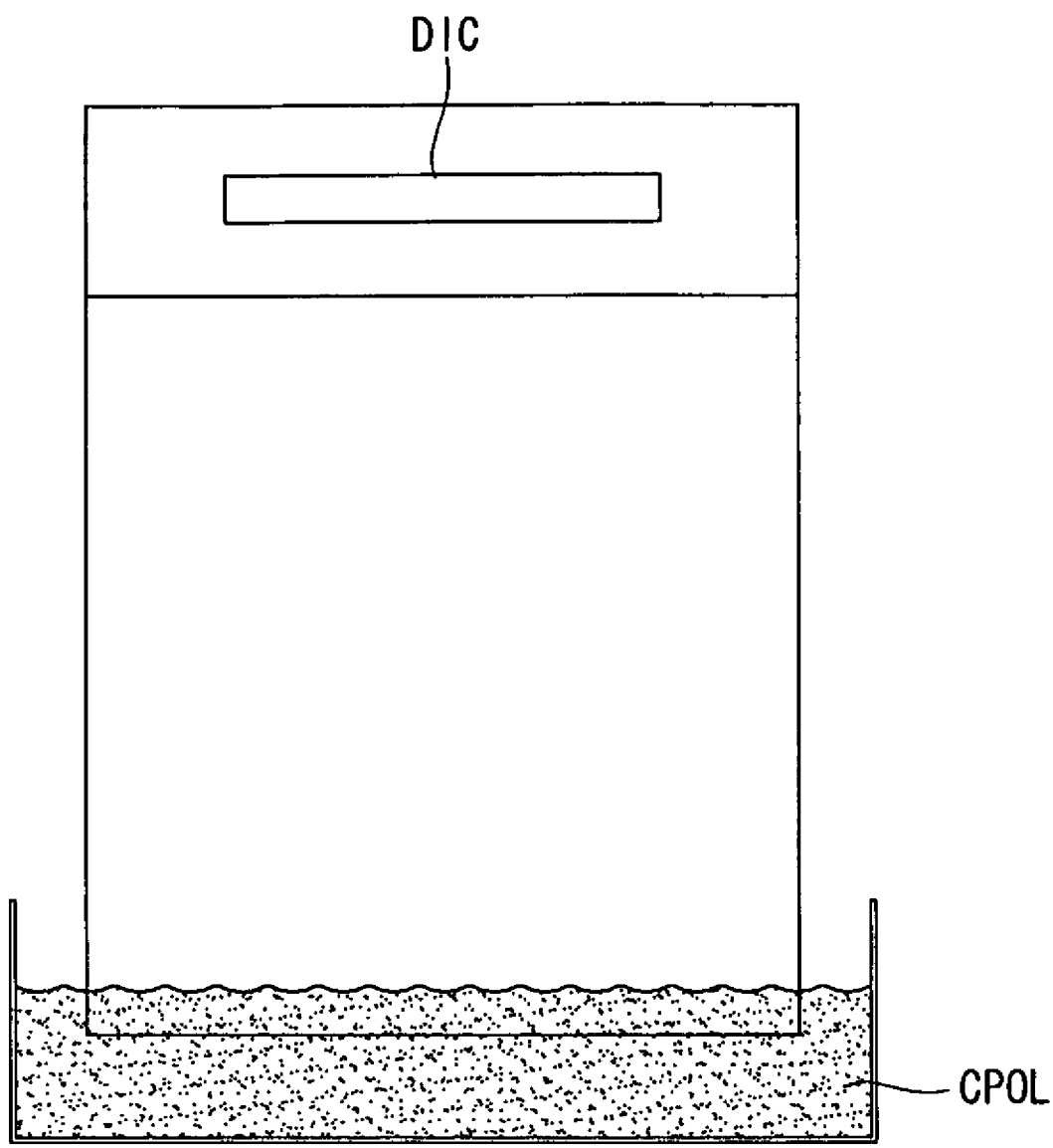
FIG. 4 is a cross sectional view illustrating the method for forming a static electricity discharging path in the fabricating method of the liquid crystal display device according to the embodiment of the present disclosure.

FIG. 4 is a diagram for explaining the upper-lower substrate connecting static electricity discharging path (CPOL) as shown in FIG. 3.

Referring to FIG. 4, the conductive polymer liquid or the metal paste is supplied to the vessel of which upper side is open. A plurality liquid crystal panel is sunk down passing the opened upper side of the vessel so that the upper edges of each liquid crystal display panels are dipped into the conductive polymer liquid or the metal paste. At the upper and lower glass substrates (GLSU and GLSL) of the liquid crystal display panel, polarization plate is attached and the upper glass substrate (GLSU) is jointed with the lower glass substrate (GLSL) by the sealant. With the dipping process, at the edge of the liquid crystal display panel, the conductive polymer liquid and the metal paste is coated.

After that, the conductive polymer liquid or the metal paste is hardened by natural drying, photo hardening or thermal hardening the liquid crystal display panel coated with the conductive polymer liquid and the metal paste. The hardened conductive polymer or metal paste forms the upper-lower substrates connecting static electricity discharging path (CPOL).

Figure 5:
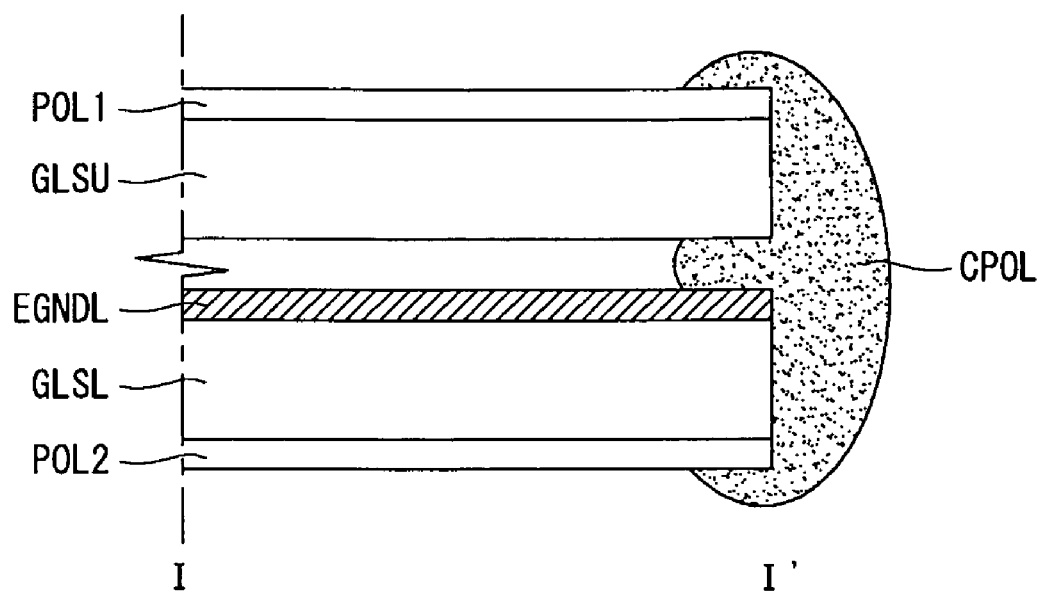
FIG. 5 is a cross sectional view cutting along the I-I' line in the FIG. 3.

FIG. 5 is a diagram illustrating the cross sectional structure of the upper-lower substrate connecting static electricity discharging path (CPOL) shown in the FIG. 3.

Referring to FIG. 5, the static electricity discharging path according to the first embodiment of the present disclosure will be explained.

Referring to FIG. 5, the upper-lower substrate connecting static electricity discharging path (CPOL) is formed at the edge of the upper polarization plate (POL1) attached on the upper glass substrate (GLSU), and the edge of the lower polarization plate (POL2) attached on the lower glass substrate (GLSL). In addition, the upper-lower substrate connecting static electricity discharging path (CPOL) is connected to the extended ground line (EGNDL) formed on the lower glass substrate (GLSL) by intruding between the upper glass substrate (GLSU) and the lower glass substrate (GLSL). Therefore, the upper-lower substrate connecting static electricity discharging path (CPOL) electrically connects the upper polarization plate (POL1) and the lower polarization plate (POL2) to the ground power source via the extended ground line (EGNDL), the ground line (GNDL), and the FPC pad (FPCPAD) to ground the upper polarization plate (POL1) and the lower polarization plate (POL2).

In the interim, the upper-lower substrate connecting static electricity discharging path (CPOL) may play role of auxiliary sealant joining the upper glass substrate and the lower glass substrate as shown in FIG. 5.

Figure 6:
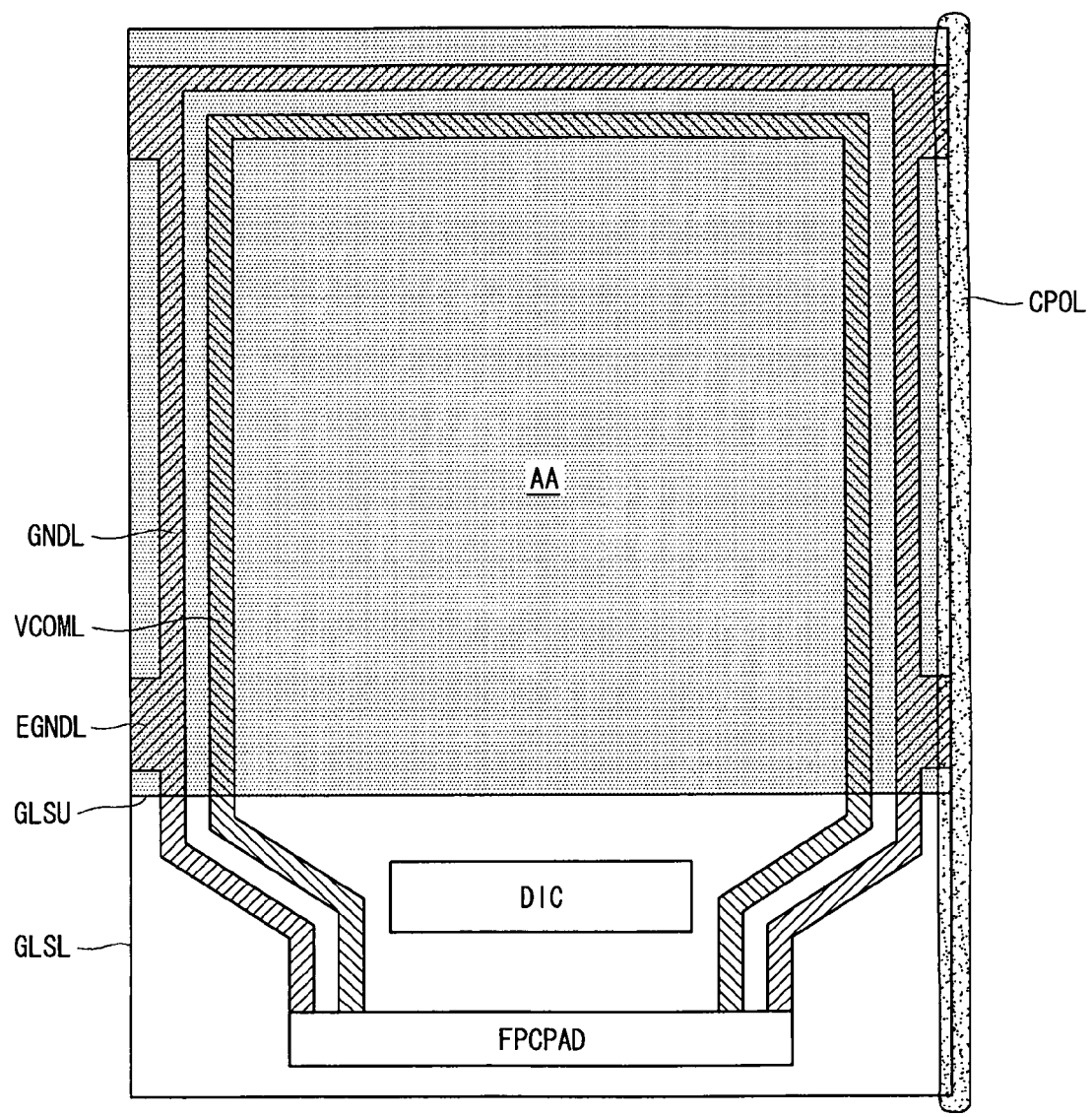
FIG. 6 is a plane view illustrating the static electricity discharging path according to the second embodiment of the present disclosure.

FIG. 6 illustrates the static electricity according to the second embodiment of the present disclosure.

Referring to FIG. 6, the static electricity discharging path includes the upper-lower substrate connecting static electricity discharging path (CPOL) formed at the left edge and/or right edge of the liquid crystal display panel.

The upper-lower substrate connecting static electricity discharging path (CPOL) connects to the extended ground line (EGNDL) expanding from the ground line (GNDL) to the left end and/or the right end of the lower glass substrate (GLSL).

The ground line (GNDL), the extended ground line (EGNDL) and the common voltage supplying line (VCOML) include the same material, for example, the transparent conductive film selected one of ITO, TO, ITZO and IZO, and the metal such as copper (Cu0, aluminum (Al), molybdenum (Mo), and chromium (Cr). They are formed at the outside of the active area, which is an edge portion of the lower glass substrate (GLSL). The ground line (GNDL) is connected to the ground power source through the FPC pad (FPCPAD). The extended ground line (EGNDL) may have wider line thickness than that of the ground line (GNDL) to expand the contact area with the upper-lower substrate connecting static electricity discharging path (CPOL).

The upper-lower substrate connecting static electricity discharging path (CPOL) including the conductive polymer and metal such as silver (Ag) electrically connects the upper polarization plate and the lower polarization plate to the extended ground line (EGNDL) formed on the lower glass substrate (GLSL) to discharge the static electricity applied from the upper and lower polarization plates to the ground line (GNDL). As the static electricity intruded into the polarization plate is discharged via the static electricity discharging path, the thin film elements in the active area and the drive IC are protected from the static electricity.

Figure 7:
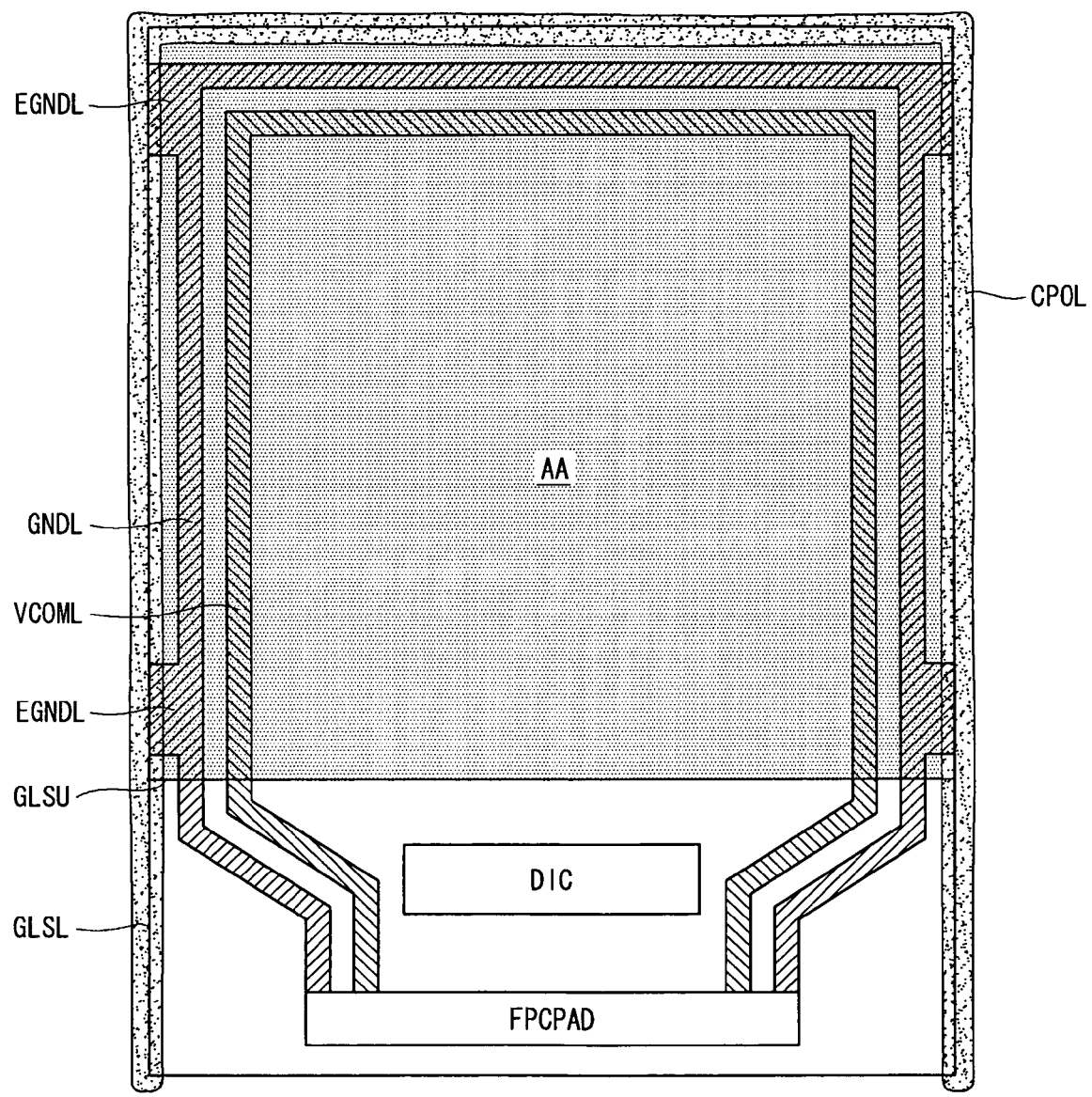
FIG. 7 is a plane view illustrating the static electricity discharging path according to the third embodiment of the present disclosure.

FIG. 7 illustrates the static electricity discharging path according to the third embodiment of the present disclosure.

Referring to the FIG. 7, the static electricity discharging path includes the upper-lower substrate connecting static electricity discharging path (CPOL) formed at upper edge, the left edge and the right edge of the LCD panel.

The upper-lower substrate connecting static electricity discharging path (CPOL) connects to the extended ground line (EGNDL) expanding from the ground line (GNDL) to the upper end, left end and right end of the lower glass substrate (GLSL).

The ground line (GNDL), the extended ground line (EGNDL) and the common voltage supplying line (VCOML) include the same material, for example, the transparent conductive film selected one of ITO, TO, ITZO and IZO, and the metal such as copper (Cu0, aluminum (Al), molybdenum (Mo), and chromium (Cr). They are formed at the outside of the active area, which is an edge portion of the lower glass substrate (GLSL). The ground line (GNDL) is connected to the ground power source through the FPC pad (FPCPAD). The extended ground line (EGNDL) may have wider line thickness than that of the ground line (GNDL) to expand the contact area with the upper-lower substrate connecting static electricity discharging path (CPOL).

The upper-lower substrate connecting static electricity discharging path (CPOL) including the conductive polymer and metal such as silver (Ag) electrically connects the upper polarization plate and the lower polarization plate to the extended ground line (EGNDL) formed on the lower glass substrate (GLSL) to discharge the static electricity applied from the upper and lower polarization plates to the ground line (GNDL). As the static electricity intruded into the polarization plate is discharged via the static electricity discharging path, the thin film elements in the active area and the drive IC are protected from the static electricity.

In the interim, the glass substrates may be replaced with transparent plastic substrates.

As mentioned above, the liquid crystal display device and the method of protecting the static electricity is to from a ground line (GNDL) and an extended ground line (EGNDL) connecting to the ground line on the lower glass substrate, and to form a upper-lower substrate connecting static electricity discharging path connecting the extended ground line (EGNDL) with the polarization plates of the upper and lower substrates. As a result, the drive IC and active area of the liquid crystal display panel can be protected from the static electricity. In addition, the process of forming the static electricity discharging path can be performed quickly and the effect for static electricity protection can be improved.

While the embodiment of the present invention has been described in detail with reference to the drawings, it will be understood by those skilled in the art that the invention can be implemented in other specific forms without changing the technical spirit or essential features of the invention. For example, the preferred embodiment explaining the liquid crystal display device can be applied to other flat panel display device such as the electro-luminescent (or "EL") device and the plasma display panel (or "PDP"). The scope of the invention is defined by the appended claims rather than the detailed description of the invention. All changes or modifications or their equivalents made within the meanings and scope of the claims should be construed as falling within the scope of the invention.

What is claimed is:
1. A liquid crystal display device comprising:
a first substrate including a ground line located around the periphery of the first substrate and supplied with a ground voltage, and an extended ground line extending outward from the ground line to the end of the first substrate, and attaching a first polarization plate;
a second substrate joining to the first substrate with a sealant and attaching a second polarization plate; and a conductive upper-lower substrate connecting static electricity discharging path connecting to the extended ground line by forming at edges of the first polarization plate and the second polarization plate, and by intruding between the first and the second substrates, wherein the ground line and the extended ground line are made of one of the materials including copper (Cu), aluminum (Al), molbdenium (Mo) and chromium (Cr), and the extended ground line is located flush with the edge of the first substrate to be connected with the static electric discharging path.

2. The device of the claim 1, wherein the extended ground line extends to one end of the first substrate so that an end of the extended ground line connects to the conductive upper-lower substrate connecting static electricity discharging path.

3. The device of the claim 1, wherein the conductive upper-lower substrate connecting static electricity discharging path includes any one of a conductive polymer and a metal.

4. The device of the claim 1, wherein the conductive upper-lower substrate connecting static electricity discharging path is formed at one edge of the first and the second substrates.

5. The device of the claim 1, wherein the conductive upper-lower substrate connecting static electricity discharging path is formed at both edges of the first and the second substrates.

6. The device of the claim 1, wherein the conductive upper-lower substrate connecting static electricity discharging path is formed at three edges of the first and the second substrates.

* * * * *